US010269064B1

(12) United States Patent
Burks et al.

(10) Patent No.: US 10,269,064 B1
(45) Date of Patent: *Apr. 23, 2019

(54) SYSTEM AND METHOD FOR PERSONALIZED SETTLEMENT VIDEO

(71) Applicant: United Services Automobile Association (USAA), San Antonio, TX (US)

(72) Inventors: Rickey Dale Burks, Boerne, TX (US); Justin Sachtleben, San Antonio, TX (US); Mark Plummer, San Antonio, TX (US); Emily Margaret Gray, San Antonio, TX (US); Carlos Winston Wilkinson, San Antonio, TX (US); Christopher Thomas Wilkinson, San Antonio, TX (US); Judy M. Cotter, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 568 days.

This patent is subject to a terminal disclaimer.

(21) Appl. No.: 14/868,800

(22) Filed: Sep. 29, 2015

Related U.S. Application Data

(63) Continuation-in-part of application No. 14/752,386, filed on Jun. 26, 2015.

(60) Provisional application No. 62/018,319, filed on Jun. 27, 2014.

(51) Int. Cl.
*G06Q 40/02* (2012.01)
*G06Q 50/16* (2012.01)

(52) U.S. Cl.
CPC .......... *G06Q 40/025* (2013.01); *G06Q 50/16* (2013.01)

(58) Field of Classification Search
USPC .......................... 705/38, 36, 37, 35, 26, 40
See application file for complete search history.

(56) References Cited

U.S. PATENT DOCUMENTS

| 7,333,943 | B1 * | 2/2008 | Charuk ................... G06Q 10/10 705/26.1 |
| 8,433,650 | B1 * | 4/2013 | Thomas ................. G06Q 10/06 705/35 |
| 9,137,029 | B1 * | 9/2015 | Vasquez ................ H04L 12/185 |
| 9,336,528 | B2 * | 5/2016 | Beaton .................... G06Q 30/02 |
| 2003/0083957 | A1 * | 5/2003 | Olefson ............. G06Q 30/0643 705/27.2 |
| 2009/0222318 | A1 * | 9/2009 | Anelevitz ............ G06Q 30/016 705/304 |

(Continued)

*Primary Examiner* — Tien C Nguyen
(74) *Attorney, Agent, or Firm* — Fish & Richardson P.C.

(57) ABSTRACT

Methods, systems, and apparatus, including computer programs encoded on computer storage media, to present a video. One of the methods includes receiving an indication of a line of a form of a settlement document. One of the methods includes obtaining settlement information for a user, the settlement information associated with the line of the form. One of the methods includes selecting non-personalized content, at least some of the non-personalized content selected based on the settlement information. One of the methods includes generating a user specific video using the settlement information and the selected non-personalized content. One of the methods also includes providing the user specific video to the user.

21 Claims, 4 Drawing Sheets

(56) References Cited

U.S. PATENT DOCUMENTS

| | | | |
|---|---|---|---|
| 2011/0261144 A1* | 10/2011 | Benefield | H04L 12/1827 348/14.08 |
| 2013/0016173 A1* | 1/2013 | Johnson | G07F 19/201 348/14.03 |
| 2013/0033522 A1* | 2/2013 | Calman | G06Q 30/0633 345/633 |

* cited by examiner

US 10,269,064 B1

SYSTEM AND METHOD FOR PERSONALIZED SETTLEMENT VIDEO

CROSS-REFERENCE TO RELATED APPLICATIONS

This application is a continuation-in-part of U.S. patent application Ser. No. 14/752,386, filed on Jun. 26, 2015, entitled "SYSTEM AND METHOD FOR PERSONALIZED SETTLEMENT VIDEO," which claims priority to U.S. Provisional Application Ser. No. 62/018,319, filed on Jun. 27, 2014, entitled "SYSTEM AND METHOD FOR PERSONALIZED SETTLEMENT VIDEO," the entire contents of which are hereby incorporated by reference.

BACKGROUND

A settlement statement describes itemize services and fees charged to the borrower by the lender or broker when applying for a loan for the purpose of purchasing or refinancing real estate. In many jurisdictions, a standard form is required by law. For example, the United States requires the use of a HUD-1 form.

SUMMARY

In general, one innovative aspect of the subject matter described in this specification can be embodied in methods that include the actions of receiving an indication of a line of a form of a settlement document. The methods also include the actions of obtaining settlement information for a user, the settlement information associated with the line of the form. The methods also include the actions of selecting non-personalized content, at least some of the non-personalized content selected based on the settlement information. The methods also include the actions of generating a user specific video using the settlement information and the selected non-personalized content. One of the methods also includes providing the user specific video to the user.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. The settlement information may be associated with a good faith estimate document or loan estimate document. The settlement information may be associated with a HUD-1 statement or Closing Disclosure. Receiving the indication of the line of the form may include receiving an image of the form taken by a camera of a mobile device. The line may be identified based on the position of the line in the picture. The line may be identified based on a locator placed on the picture. The methods may include the actions of sending information that causes the mobile device to display descriptive information about the line of the form on a user interface of the mobile device.

BRIEF DESCRIPTION OF THE DRAWINGS

Like reference numbers and designations in the various drawings indicate like elements.

DETAILED DESCRIPTION

Real estate settlement can be complex. In general, a settlement statement itemizes services and fees charged to the borrower by the lender or broker when applying for a loan for the purpose of purchasing or refinancing real estate. In the United States of America, the HUD-1 Settlement Statement is a standard form used during the settlement process. HUD refers to the Department of Housing and Urban Development. Since 2010, the HUD-1 settlement statement also contains what is referred to as a Good Faith Estimate or GFE. This additional set of information specifies estimated settlement figures provided by the lender upon application of the loan. Despite numerous references that explain settlement statements generally, user confusion about the contents of their settlement statement accounts for a substantial number of telephone calls to customer service representatives. As such, providing an automated, clear, personalized explanation of an individual's settlement statement can reduce the burden on customer service representative while providing a better experience for the individual. Other settlement statements may be used, for example, a Closing Disclosure may be used in place of the HUD-1. A loan estimate may be used in place of a good faith estimate.

Figure 1:
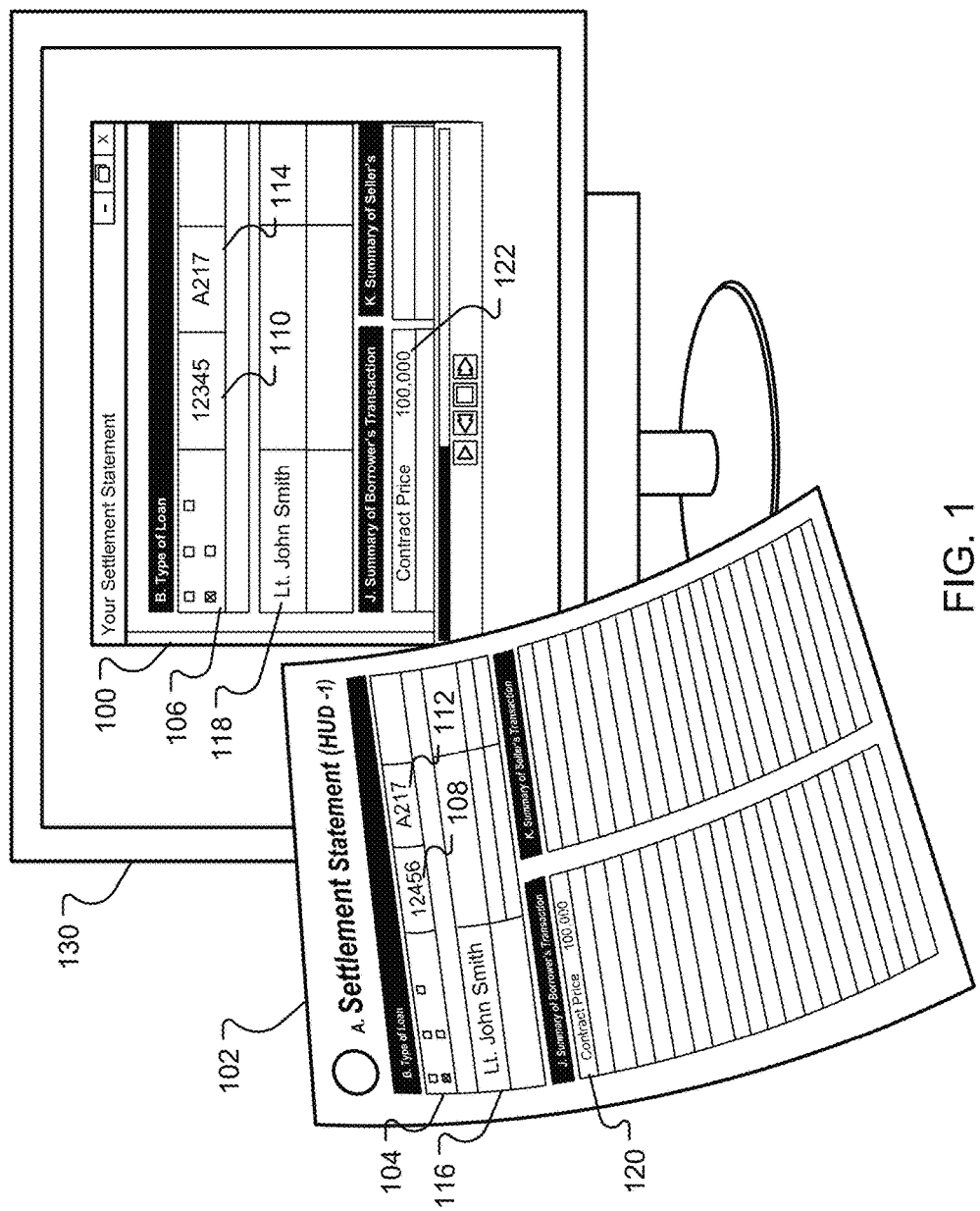
FIG. 1 illustrates an example of a dynamic video which explains a settlement statement.

FIG. 1 illustrates an example of a dynamic video 100 which explains a settlement statement 102. As described above, the settlement statement 102 is a statement that provides a detailed description of the charges and amounts of money that a purchaser is required to bring to closing. The settlement statement 102 includes details particular to the purchase of an individual house or other piece of property and will vary from buyer to buyer. For illustrative purposes, the settlement statement 102 includes a field for a type of loan, in this example a VA loan. The settlement statement 102 includes a file number 108 of 12345 and a loan number 112 of A217. The settlement statement 102 also includes the name 116 of the borrower Lt. John Smith. Finally, the settlement statement 102 includes the contract price 120 of $100,000. While a complete HUD-1 settlement statement or Closing Disclosure will include a great deal more detail, these fields suffice for illustrative purposes.

The video 100 displays the settlement statement 102 in video form. The video 100 can be presented on the monitor 130 of a client device such as a personal computer, a laptop, a smart phone, a television, or any other device capable of receiving and presenting video content. In this example, the video 100 is customized to explain the settlement statement 102 to the viewer of video. As such, video includes and shows details of the settlement statement 102 which are personal and specific to that settlement statement. For example the video 100 displays that the type of loan 106 is a VA loan, the file number 110 is 12345, the loan number 114 is A217, the borrower 116 is Lieut. John Smith, and that the contract price 122 is $100,000.

Providing a user, for example Lieut. John Smith reviewing the settlement statement 102, with a video that is personalized and walks through the particular details of the user settlement statement can dramatically reduce the costs associated with providing agents capable of answering questions about the settlement statement.

In some implementations, the video 100 may include a call to action and a mechanism for responding. A user may be able to select a link presented in the video. The link may be an icon, image, or other item presented within a video that enables the user to act on the call to action. In some implementations, the call to action and link may be presented at the end of the video. For example, selecting the link may set up a wire transfer for the correct settlement amount to the title company. Selecting the link may add the date and time of the settlement of the closing to the user's calendar.

The decision whether to include a call to action in the video 100 may include determining whether the user has a bank or investment account with a particular financial institution. For example, a system may be able to effectuate a wire transfer from some financial institutions (for example, a companion bank, partner institutions, etc.) but may not be able to effectuate a wire transfer from others.

In some implementations, the video 100 may include an embedded offer to obtain a related financial product. For example, a video about the good faith estimate or loan estimate may include an offer for home owners insurance. The offer may be presented with a link or other information that enables the user to apply for the related financial product. In some implementations, information from the loan document may be used to expedite the application for the related financial product.

The video may also include a link to an annotated settlement statement. The annotated settlement statement displays the user's settlement statement but one or more lines or sections of the settlement statement may be annotated with additional information.

The video may solicit feedback about the settlement process in general and the video in particular. For example, the video may direct the user to a customer satisfaction survey.

The video may also provide a means for the user to communicate with a customer service representative, for example, by connecting the user and the customer service representative through a chat session or by placing a telephone call. In some implementations, the video may include a link that is present throughout the video that enables the user to contact a customer service representative at any time. Selecting the link may provide the customer service representative with information about which part of the settlement statement the user is reviewing. For example, if the user is reviewing the contract price 122 and elects to contact a customer service representative, then the customer service representative may be informed that Lt. John Smith has questions about the contract price of the loan identified by loan number A217.

Figure 2:
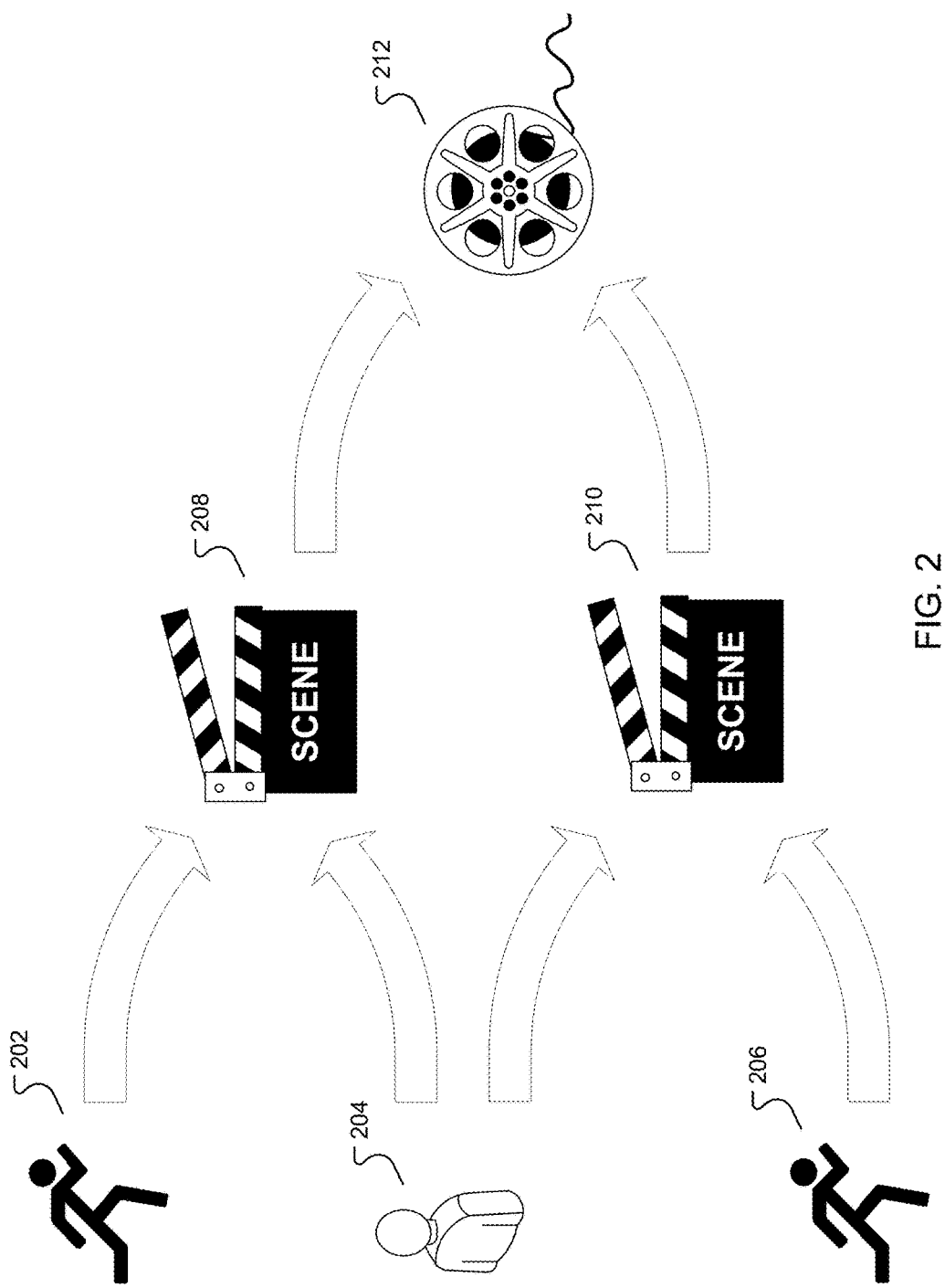
FIG. 2 illustrates an example of generating a customized video for a particular individual.

FIG. 2 illustrates an example of generating a customized video for a particular individual. A complete video is made up of one or more scenes. Each scene includes pre-rendered non-personalized creative content (that is, content that does not change) and custom generated content that is generated based on information about the subject of the video. A scene is the smallest component of the video. The transition between scenes may include a visual indicator in the video, such as a cut. Transition between scenes may also be transparent to the viewer of the video, two scenes may be set up to flow seamlessly from one into the other. So that a user viewing the video may not be able to identify where one scene ends and other begins.

In this example, non-personalized creative content 202 is combined with personal settlement information 204 to generate a scene 208. The non-personalized creative content may include any audio or visual content. For example, the non-personalized creative content may be a voiceover describing the meaning of "pre-paid interest". The personal settlement information may be the user's settlement statement. The combined scene may include the voice over describing prepaid interest while the video content shows and highlights the prepaid interest portion of the settlement statement.

Additional non-personalized creative content 206 can be combined with the personal settlement information 204 to generate a scene 210. For example, the non-personalized creative content 206 can explain a mortgage insurance premium. The personal settlement information may be, for example, a display of the amount of the mortgage insurance premium owed by the borrower.

The scenes are generated can selected based on the personal settlement information. For example, if the individual does not have to pay mortgage insurance, then the description of the mortgage insurance premium may be omitted. Scenes can also be generated to explain any balloon payment that is required at the end of the loan or any prepayment penalty for paying off the loan early.

Scenes may be created based on the type of loan, the file number, a loan number, a mortgage insurance case number, the name and address of the borrower, the name and address of the seller, the name and address of the lender, the location of the property, the settlement agent, the place of settlement, and the settlement date.

Scenes may also be created for items in the settlement statement from the point of view of the borrower. The details may include details of the gross amount due from borrower, such as contract sales price, personal property, and settlement charges to borrower; adjustments for items paid by seller in advance such as, city/town taxes, county taxes, and assessments; gross amount due from borrower; amount paid by or in behalf of borrower, such as: deposit or earnest money, principal amount of new loan(s), existing loan(s) taken subject to clauses, total interest paid over the life of the loan, as a percentage; adjustments for items unpaid by the seller, such as: city/town taxes, county taxes, assessments; total paid by/for borrower cash at settlement from/to borrower; gross amount due from borrower; amounts paid by/for borrower. A scene may also include a breakdown of the payments made by the user over a period of time (e.g. five years). The scene may explain how much of the amount paid over that period is applied to interest and how much is applied to the principal balance of the loan. A scene may also explain whether the loan will be sold.

Scenes may also be created for items in the settlement sheet from the point of view of the seller. The details may include gross amount due to seller, including contract sales price, and personal property; adjustments for items paid by the seller in advance, such as: city/town taxes, county taxes, and assessments; gross amount due to seller; reductions in amount due to seller, such as, excess deposit, settlement charges to seller, existing loan(s) taken subject to clauses, payoff of first mortgage loan, and payoff of second mortgage loan; adjustments for items unpaid by the seller, such as city/town taxes, county taxes, and assessments; total reduction amount due seller; cash at settlement to/from seller; gross amount due to seller; and less reductions in amounts due seller.

Other settlement information that may form the basis of a scene includes the total real estate broker fees, including a report on the division of the commission and the commission paid as part of the settlement. Scenes may include information about items payable in connection with the loan including origination charge, credit or charge (points) for the specific interest rate chosen, adjusted origination charges, appraisal fee, credit report fees, tax service fees, and flood certification fees.

Scenes may include information about items required by the lender to be paid in advance, including: daily interest charges, including information about the duration and rate that the charges accumulate, mortgage insurance premiums, and homeowner's insurance premiums.

Scenes may include information about reserves deposited with the lender for an initial deposit, homeowners insurance, mortgage insurance, property tax, and other adjustments. Scenes may include information about title charges including title services and lender's title insurance, settlement or closing fees, owner's title insurance, lender's title insurance, lender's title policy limit, owner's title policy limit, agent's portion of the total title insurance premiums, and underwriter's portion of the total title insurance premiums.

Scenes may include information about government recording and transfer charges including government recording charges including deed recording, mortgage recording, and release recording, transfer taxes, city/county tax or stamps for deed and/or mortgage, state tax or stamps for deed and/or mortgage. Scenes may also be created for any additional settlement charges.

Scenes may also include information about a comparison about a good faith estimate and the actual charges. The scenes can include a description of charges that cannot increase, such as origination charges, credit charges, adjusted origination charges, and transfer taxes. The scenes can include a description of charges that cannot increase by more than 10%, such as government recording charges. The scenes can include a description of charges that can change including the initial deposit for your escrow account, daily interest charges, and homeowner's insurance.

The scenes may also describe the terms of the loan including the loan amount, the term (duration) of the loan, the initial interest rate of the loan, the initial monthly amount owed for principal, interest, and mortgage insurance premium, a description as to whether, under what circumstances, and how much the interest rate can rise, prepayment penalty, can the loan balance rise, a balloon payment, total monthly amount owed, monthly charges owed for escrow, property taxes, homeowners insurance, flood insurance, and other monthly charges.

A scene may also include a call to action and a link to respond to the call, as described above.

The scenes 208, 210 are combined to a video 212 that is customized for the individual. The final video can include content from the user's individual settlement statement.

In some implementations, multiple videos can be generated. For example, a video may explain portions of the good faith or loan estimate. A separate video may explain portions of the HUD-1 or Closing Disclosure. A separate video may explain the logistical details of closing (where it will be, how much money to bring to closing, etc. . . . ). In some implementations, a video may be generated that compares different documents generated as part of the loan process. For example, a video may compare an estimated statement (such as a good faith estimate or a loan estimate) with the settlement statement presented at closing (such as the HUD-1 or the Closing Disclosure.)

The system can dynamically generate the video so that if the underlying information changes (e.g. the interest rate changes, the user selects a different loan product, etc. . . . ) then the video is updated the next time it is accessed.

Figure 2A:
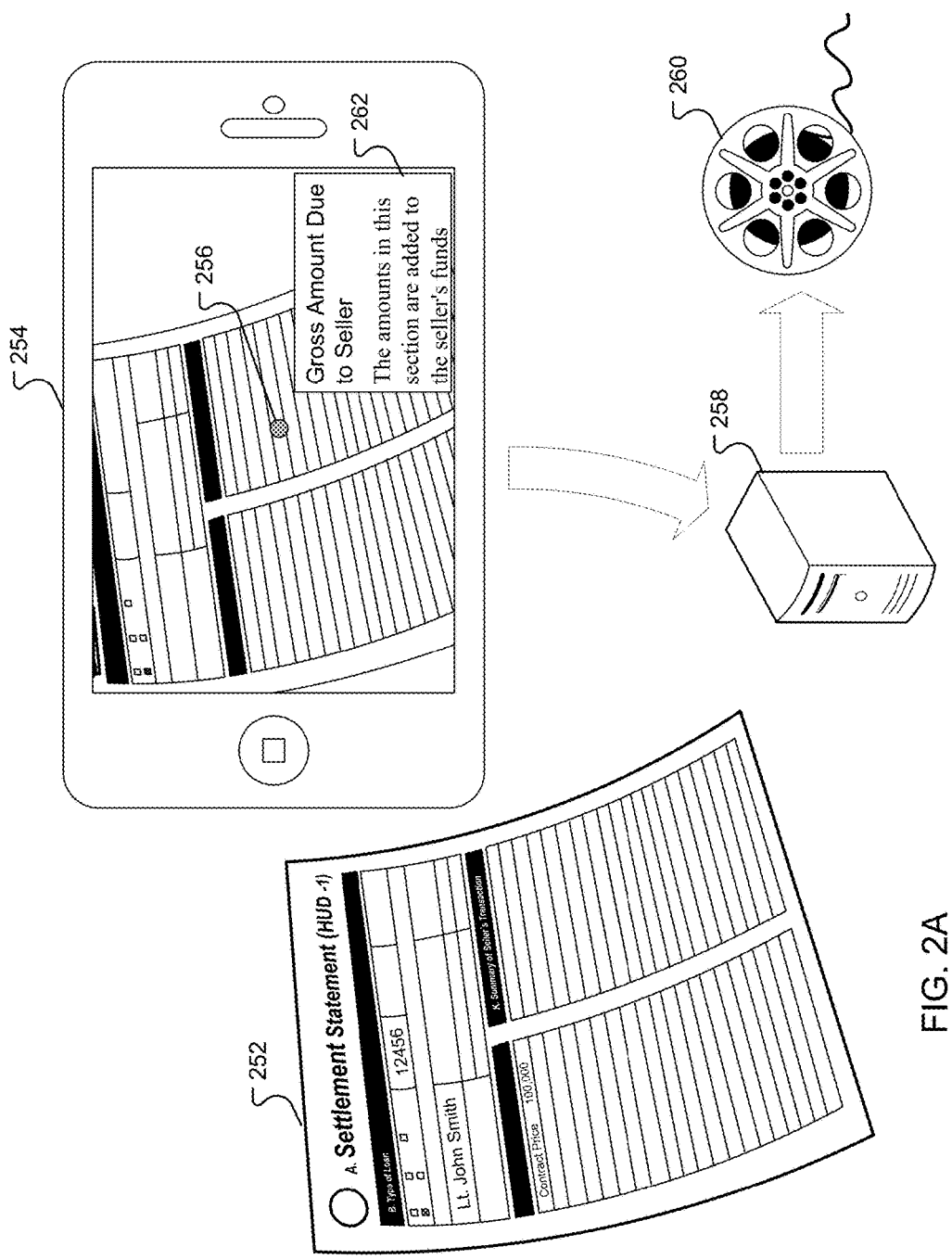
FIG. 2A, illustrates an example of generating videos based on other areas of the settlement document.

Referring to FIG. 2A, in some implementations, videos 260 on less common topics may be generated based on user interest. For example, a user may request that a particular portion of a settlement statement be explained. A system 258 may generate a video 260 on that portion of the settlement statement on demand. The user may identify the portion of the settlement statement by, for example, clicking on selecting a line of an on-line settlement statement.

The user may use the camera on their phone 254 or other portable device to identify a portion of a printed settlement statement 252 that they would like explained. For example, an augmented reality application may put a marker 256 on the camera image, such as a dot or crosshair. The user points the camera such that the requested line or section (e.g. the dot or cross hair are on the line or section) and the user may take a picture or otherwise indicate that the image is correctly aligned. The system 258 can analyze the picture to determine which line or section the user is requesting and generate a video 260 based on the determined line or section. The system may additionally generate a descriptive image overlay 262 in real-time within the camera display that provides additional context to the selected section.

Figure 3:
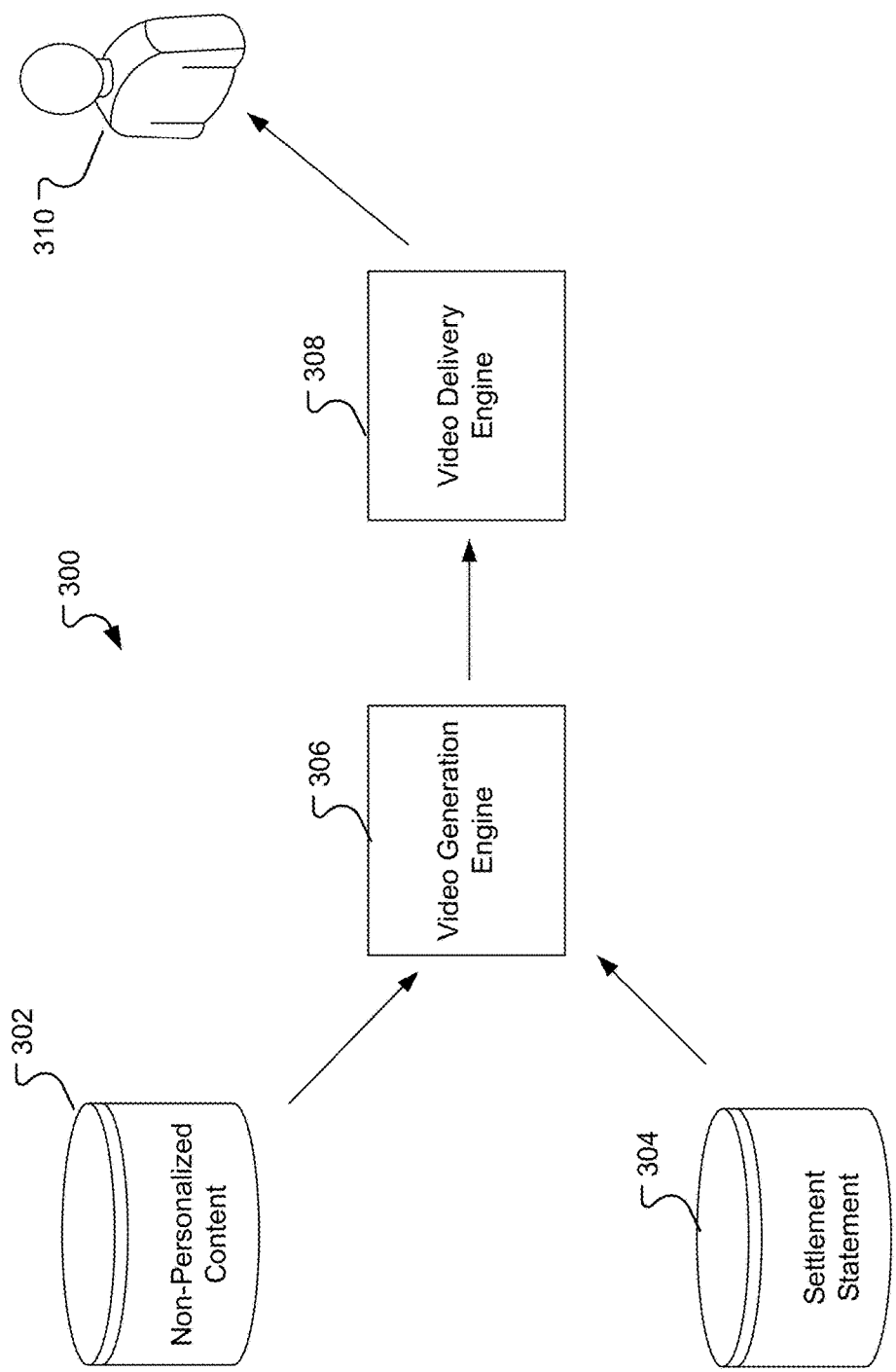
FIG. 3 illustrates an example system for generating a customized video.

FIG. 3 illustrates an example system 300 for generating a customized video. A non-personalized creative content data store 302 stores non-personalized creative content, that is, content that is not change based on the content of the settlement statement. Non-personalized creative content can include, for example, images, movie clips, sound clips. The non-personalized creative content data store 302 may be, for example, a relational database, a file system, an object database, or any other system that enables content to be stored and organized for later access.

The settlement statement data store 304 may content the settlement statement information for one or more users. The settlement statement data store 304 may store the content of the statement organized in a database or other information retrieval system. The settlement statement data store 304 may also store a digital copy of a settlement statement itself, or a spreadsheet representation of the settlement statement.

The video generation engine 306 can accept the information from the settlement statement data source 304 and the non-personalized content and generate a personalized video that explains a real estate settlement statement for an individual.

The video generation engine 306 can make the video available to a video delivery engine 308. The video delivery engine 308 can be a webserver that provides the video in conjunction with a web page. In some implementations, the video delivery engine 308 can provide the video to a user 310 in an e-mail, message, or through another medium. Once received, the user can view the personalized video which includes the details of the individuals settlement statement, including video representations of values included in the statement.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A computer-implemented method comprising:
   receiving an indication of a line of a form of a settlement document;
   obtaining settlement information for a user, the settlement information associated with the line of the form;
   selecting non-personalized content, at least some of the non-personalized content selected based on the settlement information;
   generating a user specific video using the settlement information and the selected non-personalized content; and
   providing the user specific video to the user.

2. The computer-implemented method of claim 1, wherein the settlement information is associated with a good faith estimate document or loan estimate document.

3. The computer-implemented method of claim 1, wherein the settlement information is associated with a HUD-1 statement or Closing Disclosure.

4. The computer-implemented method of claim 1, wherein receiving the indication of the line of the form comprises receiving an image of the form taken by a camera of a mobile device.

5. The computer-implemented method of claim 4, wherein the line is identified based on the position of the line in the picture.

6. The computer-implemented method of claim 4, wherein the line is identified based on a locator placed on the picture.

7. The computer-implemented method of claim 1, further comprising:
   sending information that causes the mobile device to display descriptive information about the line of the form on a user interface of the mobile device.

8. A system comprising:
   one or more computers and one or more storage devices storing instructions that are operable, when executed by the one or more computers, to cause the one or more computers to perform operations comprising:
      receiving an indication of a line of a form of a settlement document;
      obtaining settlement information for a user, the settlement information associated with the line of the form;
      selecting non-personalized content, at least some of the non-personalized content selected based on the settlement information;
      generating a user specific video using the settlement information and the selected non-personalized content; and
      providing the user specific video to the user.

9. The system of claim 8, wherein the settlement information is associated with a good faith estimate document or loan estimate document.

10. The system of claim 8, wherein the settlement information is associated with a HUD-1 statement or Closing Disclosure.

11. The system of claim 8, wherein receiving the indication of the line of the form comprises receiving an image of the form taken by a camera of a mobile device.

12. The system of claim 11, wherein the line is identified based on the position of the line in the picture.

13. The system of claim 11, wherein the line is identified based on a locator placed on the picture.

14. The system of claim 8, wherein the operations further comprise:
   sending information that causes the mobile device to display descriptive information about the line of the form on a user interface of the mobile device.

15. A non-transitory computer storage medium encoded with computer program instructions that when executed by one or more computers cause the one or more computers to perform operations comprising:
   receiving an indication of a line of a form of a settlement document;
   obtaining settlement information for a user, the settlement information associated with the line of the form;
   selecting non-personalized content, at least some of the non-personalized content selected based on the settlement information;
   generating a user specific video using the settlement information and the selected non-personalized content; and
   providing the user specific video to the user.

16. The non-transitory computer storage medium of claim 15, wherein the settlement information is associated with a good faith estimate document or loan estimate document.

17. The non-transitory computer storage medium of claim 15, wherein the settlement information is associated with a HUD-1 statement or Closing Disclosure.

18. The non-transitory computer storage medium of claim 15, wherein receiving the indication of the line of the form comprises receiving an image of the form taken by a camera of a mobile device.

19. The non-transitory computer storage medium of claim 18, wherein the line is identified based on the position of the line in the picture.

20. The non-transitory computer storage medium of claim 18, wherein the line is identified based on a locator placed on the picture.

21. The non-transitory computer storage medium of claim 15, wherein the operations further comprise:
   sending information that causes the mobile device to display descriptive information about the line of the form on a user interface of the mobile device.

* * * * *